(12) United States Patent
Lin et al.

(10) Patent No.: US 11,876,945 B2
(45) Date of Patent: Jan. 16, 2024

(54) DEVICE AND METHOD FOR ACQUIRING SHADOW-FREE IMAGES OF DOCUMENTS FOR SCANNING PURPOSES

(71) Applicant: Mobile Drive Technology Co., Ltd., New Taipei (TW)

(72) Inventors: Yun-Hsuan Lin, New Taipei (TW); Yung-Yu Chuang, New Taipei (TW); Nai-Sheng Syu, New Taipei (TW); Tzu-Kuei Huang, New Taipei (TW); Ting-Hao Chung, New Taipei (TW); Yu-Ching Wang, New Taipei (TW); Chun-Hsiang Huang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 309 days.

(21) Appl. No.: 17/154,950

(22) Filed: Jan. 21, 2021

(65) Prior Publication Data
US 2021/0227096 A1 Jul. 22, 2021

(30) Foreign Application Priority Data
Jan. 21, 2020 (CN) .......................... 202010070620.8

(51) Int. Cl.
*G06K 9/00* (2022.01)
*H04N 1/58* (2006.01)
(Continued)

(52) U.S. Cl.
CPC ................. *H04N 1/58* (2013.01); *G06N 3/08* (2013.01); *G06T 5/006* (2013.01); *G06T 5/50* (2013.01);
(Continued)

(58) Field of Classification Search
CPC . G06T 2207/10008; G06T 2207/20081; G06T 2207/20084; G06T 2207/30176;
(Continued)

(56) References Cited

U.S. PATENT DOCUMENTS

2019/0266706 A1* 8/2019 Mondal .................... G06T 5/30
2021/0224565 A1* 7/2021 Lin .......................... G06F 18/214

FOREIGN PATENT DOCUMENTS

CN    107146210    9/2017
CN    107886502    4/2018
(Continued)

OTHER PUBLICATIONS

Stacked Conditional Generative Adversarial Networks for Jointly Learning Shadow Detection and Shadow Removal Jifeng Wang, Xiang Li, Jian Yang; Proceedings of the IEEE Conference on Computer Vision and Pattern Recognition (CVPR), 2018, pp. 1788-1797 (Year: 2018).*

(Continued)

*Primary Examiner* — Alex Kok S Liew
(74) *Attorney, Agent, or Firm* — ScienBiziP, P.C.

(57) ABSTRACT

A method for acquiring shadow-free images of a document for scanning or other purposes is applied in a device. The method includes training a shadow prediction model based on sample documents of a sample library and inputting a background color and a shadow mask of each of the sample documents extracted by the shadow prediction model into a predetermined shadow removing network for training, to obtain a shadow removing model. The method further includes obtaining a background color and a shadow mask of the document through the shadow prediction model and removing the shadows of the document based on the shadow removing model. The device utilizing the method is also disclosed.

10 Claims, 2 Drawing Sheets

(51) Int. Cl.
*G06T 5/00* (2006.01)
*G06T 5/50* (2006.01)
*G06N 3/08* (2023.01)

(52) U.S. Cl.
CPC ............ *G06T 2207/10008* (2013.01); *G06T 2207/10024* (2013.01); *G06T 2207/20081* (2013.01); *G06T 2207/20084* (2013.01)

(58) Field of Classification Search
CPC .......... G06T 5/008; G06T 2207/10024; G06T 2207/10016; G06T 7/0012; G06T 7/20; G06T 2207/10032; G06T 2207/30188; G06T 5/50; G06N 3/08; G06N 20/00; G06N 5/022; G06N 5/04; G06N 5/025; G06N 7/02; G06N 3/045; G06N 3/084; G06N 3/044; G06N 3/047; G06N 7/023; G06N 3/04; G06N 3/088; G06N 3/063; G06N 7/01; G06N 3/049; G06N 3/082; G06N 5/01; G06N 3/0455; G06N 3/0464; G06N 20/10; G06N 3/048; G06N 3/02; G06N 3/0475; G06N 3/09; G06N 3/094; G06N 3/096; G06N 3/098; G06Q 10/107; G06Q 10/10; G06Q 10/04
See application file for complete search history.

(56) References Cited

FOREIGN PATENT DOCUMENTS

| | | |
|---|---|---|
| CN | 110674815 | 1/2020 |
| TW | I451342 | 9/2014 |
| TW | 201447773 | 12/2014 |

OTHER PUBLICATIONS

L. Qu, J. Tian, S. He, Y. Tang and R. W. H. Lau, "DeshadowNet: A Multi-context Embedding Deep Network for Shadow Removal," 2017 IEEE Conference on Computer Vision and Pattern Recognition (CVPR), Honolulu, HI, USA, 2017, pp. 2308-2316, doi: 10.1109/CVPR.2017.248. (Year: 2017).*

Kingma & Ba, "Adam: A Method for Stochastic Optimization" ICLR 2015 (Year: 2015).*

B. Wang and C. L. P. Chen, "Local Water-Filling Algorithm for Shadow Detection and Removal of Document Images," Sensors, vol. 20, No. 23, p. 6929, Dec. 2020 (Year: 2020).*

* cited by examiner

DEVICE AND METHOD FOR ACQUIRING SHADOW-FREE IMAGES OF DOCUMENTS FOR SCANNING PURPOSES

FIELD

The subject matter herein generally relates to image processing.

BACKGROUND

Mobile phones can capture photos of document to realize a document scanning function without using a scanner. However, shadows of the mobile phone or other can block documents or part of them when using the mobile phone, rendering the scanning process ineffective.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
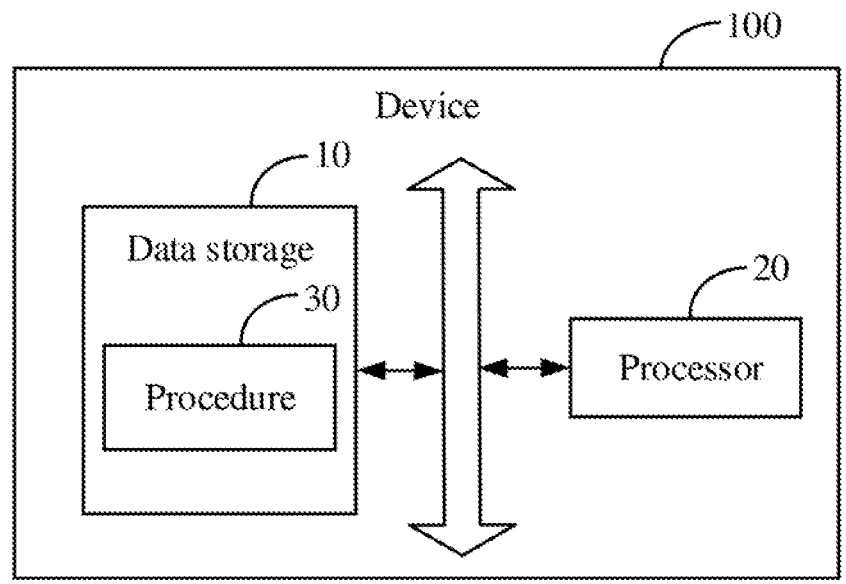
FIG. 1 is a block diagram of an embodiment of a device for removing shadows of a document.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

The term "comprising," when utilized, means "including, but not necessarily limited to"; it specifically indicates open-ended inclusion or membership in the so-described combination, group, series, and the like.

FIG. 1 illustrates one embodiment of a device (device 100) for removing shadows of a document. The device 100 can comprise at least one data storage 10, at least one processor 20, and a procedure for removing the shadows of the document (procedure 30). The procedure 30 may comprise a plurality of computerized codes, the plurality of computerized codes may include commands that can be executed by the processor 20.

In one embodiment, the device 100 can be a mobile phone, a tablet personal computer, or the like. The device 100 can further comprise a camera, a display device, a network access device, and communication buses. The camera can be configured to capture image of an object to generate a document.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

Figure 2:
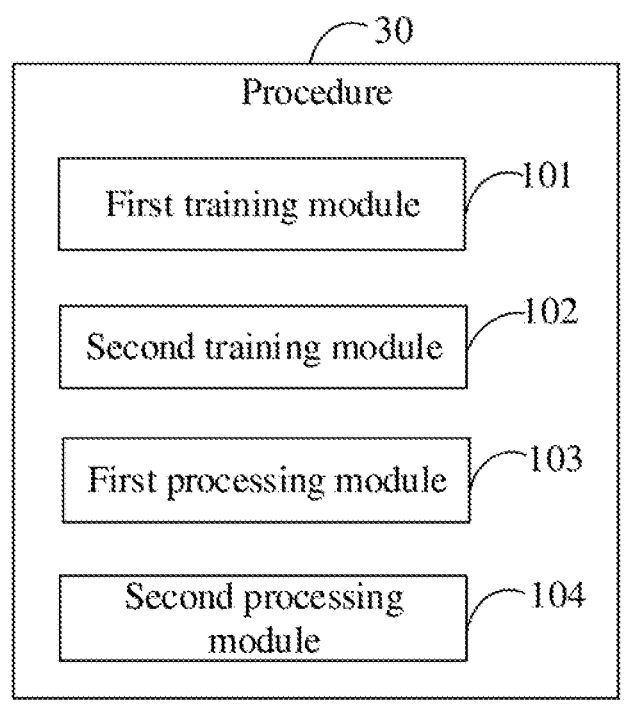
FIG. 2 is a block diagram of an embodiment of a procedure for removing shadows from a document applied in the device of FIG. 1.

FIG. 2 illustrates the procedure 30. The procedure 30 comprises a plurality of modules, such as a first training module 101, a second training module 102, a first processing module 103, and a second processing module 104. The modules 101-104 may comprise one or more software programs in the form of computerized codes stored in the data storage 10. The computerized codes may include commands that can be executed by the processor 20 to provide functions for the modules 101-104.

The first training module 101 trains a shadow prediction model based on sample documents of a sample library.

In one embodiment, the shadow prediction model can be trained through a supervised learning architecture. For example, the first training module 101 can train a predetermined deep learning network based on the sample documents of the sample library to obtain the shadow prediction model. The predetermined deep learning network can be selected according to an actual application, for example, the predetermined deep learning network can be a convolutional neural network (CNN) architecture, a recurrent neural network (RNN) architecture, or a back propagation (BP) network architecture, etc. The sample library can be established in a predetermined manner before model training. For example, the sample documents can be manually collected or built up by automatic collection, and stored in a specified storage area to establish the sample library. The sample documents in the sample library can comprise a plurality of first sample documents with shaded regions or shadows and a plurality of second sample documents free of shading. The sample library can be stored in the data storage 10, or other storage devices not belonging to the device 100.

In one embodiment, training features of each of the sample documents can comprise a background color and a shadow mask. The shadow mask can comprise a shadow region and a shadow intensity. The shadow prediction model trained by the first training module 101 can be configured to extract the background color and the shadow mask of a document. Shadows of the plurality of first sample documents can be added by a predetermined shadow adding software to facilitate the extraction of training features. For example, a modeler can use the predetermined shadow adding software to add shadows into a plurality of documents to obtain the plurality of first sample documents. The predetermined shadow adding software can be selected according to the actual application.

In one embodiment, the predetermined deep learning network can comprise an input layer, multiple hidden layers, and an output layer. The first training module 101 can randomly divide the sample documents of the sample library into a training set and a test set. An amount of data of the training set is greater than an amount of data of the test set. For example, there may be eighty percent of the sample documents in the training set, and twenty percent of the sample documents in the test set.

The first training module 101 can train the predetermined deep learning network through the training set to obtain a first intermediate model, test the first intermediate model through the test set, and count the number of testing of the first intermediate model based on a result of testing of each sample document in the test set. The first training module 101 can further determine whether a testing result of the first intermediate model meets a predetermined standard. If the testing result of the first intermediate model meets the predetermined standard, the first training module 101 can stop training the predetermined deep learning network and define the first intermediate model as the shadow prediction model. If the testing result of the first intermediate model does not meet the predetermined standard, the first training module 101 can adjust training parameters of the predetermined deep learning network, and retrain the predetermined deep learning network with the adjusted training parameters through the training set to obtain a second intermediate model and testing the second intermediate model through the test set. If a testing result of the second intermediate model still does not meet the predetermined standard, the first training module 101 can perform repeated adjustment steps of model parameters until a testing result of retrained intermediate model meets the predetermined standard.

For example, each group of data (sample document) for testing in the test set is inputted to the first intermediate model to extract a background color and a shadow mask. If an extraction of the extractable data meets a requirement, the result is defined as passing, if the extraction does not meets the requirement, the result is defined as failure.

In one embodiment, the training parameters of the predetermined deep learning network can comprise a total number of layers, and a number of neurons in each layer. The adjusting of training parameters can comprise: adjusting the total number of layers of the predetermined deep learning network and/or a number of neurons in each layer of the predetermined deep learning network.

When the testing result of the first intermediate model meets the predetermined standard, the first intermediate model meets the requirements of the model and is passed. The first training module 101 can define the first intermediate model as the shadow prediction model. When the testing result of the first intermediate model does not meet the predetermined standard, the first intermediate model is deemed to fail. The first training module 101 can adjust the training parameters of the predetermined deep learning network and retrain the adjusted predetermined deep learning network through the training set to obtain a second intermediate model. The first training module 101 further tests the second intermediate model through the test set. When the testing result of the second intermediate model meets the predetermined standard, the second intermediate model is deemed to pass. The first training module 101 can define the second intermediate model as the shadow prediction model. If the testing result of the second intermediate model still results in failing, the first training module 101 can perform repeated adjustment steps of model parameters until a result of testing of retrained intermediate model is a pass.

In one embodiment, the predetermined standard may be defined according to the actual application, for example, the predetermined standard can be ninety-five percent. When a precision rate of shadow extraction of the first intermediate model is greater than the predetermined threshold, then the first intermediate model is deemed to meet the requirements of the model.

The second training module 102 inputs the background color and the shadow mask of each of the sample documents extracted by the shadow prediction model into a predetermined shadow removing network for training to obtain a shadow removing model.

In one embodiment, the predetermined shadow removing network can be a current network with a shadow removing function established by a deep learning architecture. When the shadow prediction model is trained by the first training module 101, the shadow prediction model can be configured to extract the background color and the shadow mask of each sample document in the sample library. The second training module 102 can input the background color and the shadow mask of each sample document extracted by the shadow prediction model to the predetermined shadow removing network for training to obtain the shadow removing model. Training processes of the shadow removing model can be set according to an actual requirement. For example, the training processes of the shadow removing model can refer to the training processes of the shadow prediction model. When the shadow removing model is trained, the shadow removing model can perform shadow removing based on the background color and the shadow mask of the document. Then, a shadow removing effect and a shadow removing accuracy of the current network with the shadow removing function can be improved. Versatility of the shadow removing model is wide.

The first processing module 103 obtains a background color and a shadow mask of an object document through the shadow prediction model.

In one embodiment, the object document can be a document captured by the device 100. When the shadow prediction model and the shadow removing model are trained, the object document can be processed through the shadow prediction model and the shadow removing model. The first processing module 103 can input the object document into the shadow prediction model to obtain the background color and the shadow mask of the object document.

The second processing module 104 inputs the background color and the shadow mask of the object document into the shadow removing model to remove shadows of the object document.

In one embodiment, when the background color and the shadow mask of the object document are extracted, the second processing module 104 can input the background color and the shadow mask of the object document into the shadow removing model to remove the shadows of the object document.

Figure 3:
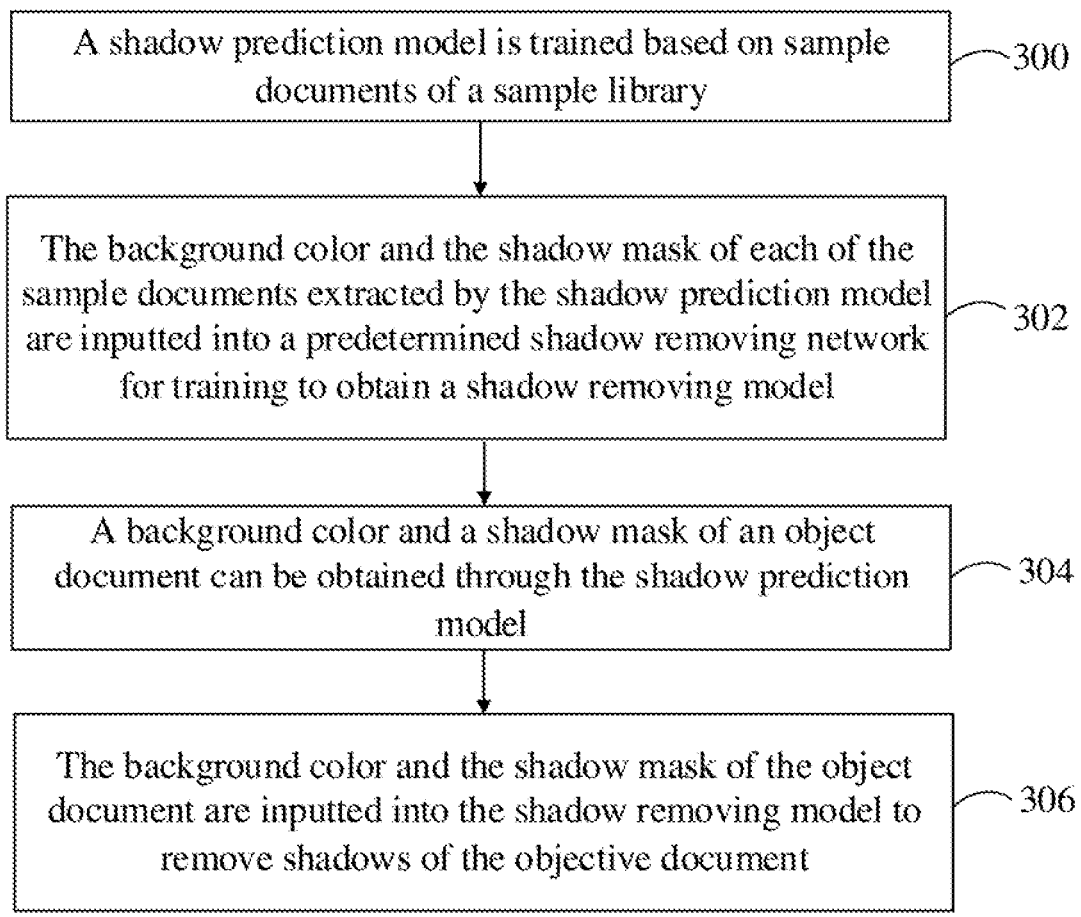
FIG. 3 is a flow diagram of an embodiment of a method for removing shadows of the document utilized in the device of FIG. 1.

FIG. 3 illustrates one exemplary embodiment of a method for removing shadows from a document. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, a shadow prediction model is trained based on sample documents of a sample library.

In one embodiment, the shadow prediction model can be trained through a supervised learning architecture. For example, a predetermined deep learning network can be trained based on the sample documents of the sample library to obtain the shadow prediction model. The predetermined deep learning network can be selected according to an actual application, for example, the predetermined deep learning network can be a CNN architecture, a RNN architecture, or a BP network architecture, etc. The sample library can be established through a predetermined manner before model training. For example, the sample documents can be manually or automatically collected, and stored in a specified storage area to establish the sample library. The sample documents in the sample library can comprise a plurality of first sample documents with shaded regions or shadows and a plurality of second sample documents without shadows.

In one embodiment, training features of each of the sample documents can comprise a background color and a shadow mask. The shadow prediction model can be configured to extract the background color and the shadow mask of a document. Shadows of the plurality of first sample documents can be added by a predetermined shadow adding software to facilitate the extraction of training features. For example, a modeler can use the predetermined shadow adding software to add shadows into a plurality of documents to obtain the plurality of first sample documents. The predetermined shadow adding software can be selected according to the actual application.

In one embodiment, the predetermined deep learning network can comprise an input layer, multiple hidden layers, and an output layer. The sample documents of the sample library can be divided into a training set and a test set. An amount of data of the training set is greater than an amount of data of the test set. For example, there can be eighty percent of the sample documents in the training set, and twenty percent of the sample documents in the test set.

The predetermined deep learning network can be trained through the training set to obtain a first intermediate model, test the first intermediate model through the test set, and count the number of times that testing of the first intermediate model is done, based on a result of testing of each sample document in the test set. If a testing result of the first intermediate model meets the predetermined standard, the predetermined deep learning network stops the training, and the first intermediate model is defined as the shadow prediction model. If the testing result of the first intermediate model does not meet the predetermined standard, training parameters of the predetermined deep learning network can be adjusted, the predetermined deep learning network with the adjusted training parameters is retrained through the training set to obtain a second intermediate model, and the second intermediate model is tested through the test set. If a testing result of the second intermediate model still does not meet the predetermined standard, adjustment steps of model parameters can be repeated to perform until a testing result of retrained intermediate model meets the predetermined standard.

For example, each group of data (sample document) of the test set is inputted to the first intermediate model to extract a background color and a shadow mask. If a extraction of the test data meets a requirement, the testing result of the test data is defined as passing, if the extraction of the test data does not meet the requirement, the testing result of the test data is defined as failure.

In one embodiment, the training parameters of the predetermined deep learning network can comprise a total number of layers, and a number of neurons in each layer. The adjusting of training parameters can comprise: adjusting the total number of layers of the predetermined deep learning network and/or a number of neurons in each layer of the predetermined deep learning network.

When the testing result of the first intermediate model meets the predetermined standard, the first intermediate model is regarded as meeting the requirements of the model. The first intermediate model can be defined as the shadow prediction model. When the testing result of the first intermediate model does not meet the predetermined standard, the first intermediate model is deemed not to meet the requirements of the model. The training parameters of the predetermined deep learning network can be adjusted, and the adjusted predetermined deep learning network is retrained through the training set to obtain a second intermediate model. The second intermediate model is tested through the test set to obtain the testing result of the second intermediate model. When the testing result of the second intermediate model meets the predetermined standard, the second intermediate model is deemed equal to the requirement of the model. The second intermediate model can be defined as the shadow prediction model. When the testing result of the second intermediate model still does not meet the predetermined standard, adjustment steps of model parameters can be repeated until a result of testing of retrained intermediate model shows compliance with the predetermined standard.

In one embodiment, the predetermined standard may be defined according to the actual application, for example, the predetermined standard can be ninety-five percent. When a precision rate of shadow extraction of the first intermediate model is greater than the predetermined threshold, then the first intermediate model meets the requirements of the model.

In block 302, the background color and the shadow mask of each of the sample documents extracted by the shadow prediction model are inputted into a predetermined shadow removing network for training to obtain a shadow removing model.

In one embodiment, the predetermined shadow removing network can be a current network with a shadow removing function established by a deep learning architecture. When the shadow prediction model is trained, the shadow prediction model can be configured to extract the background color and the shadow mask of each sample document in the sample library. The background color and the shadow mask of each sample document extracted by the shadow prediction model can be inputted to the predetermined shadow removing network for training to obtain the shadow removing model. Training processes of the shadow removing model can be set according to an actual requirement. For example, the training processes of the shadow removing model can refer to the training processes of the shadow prediction model. When the shadow removing model is trained, the shadow removing model can perform shadow removing based on the background color and the shadow mask of the document. Then, a shadow removing effect and a shadow removing accuracy of the current network with the shadow removing function can be improved. Versatility of the shadow removing model is wide.

In block 304, a background color and a shadow mask of an object document are obtained through the shadow prediction model.

In one embodiment, when the shadow prediction model and the shadow removing model are trained, the object document can be processed through the shadow prediction model and the shadow removing model. The object document can be inputted into the shadow prediction model to obtain the background color and the shadow mask of the object document.

In block 306, the background color and the shadow mask of the object document are inputted into the shadow removing model to remove shadows of the object document.

In one embodiment, when the background color and the shadow mask of the object document are extracted, the background color and the shadow mask of the object document can be inputted into the shadow removing model to remove the shadows of the object document.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A shadow removing method comprising:
    training a shadow prediction model based on sample documents of a sample library, wherein training features of each of the sample documents comprises a background color of each of the sample documents and a shadow mask of each of the sample documents, the background color is equivalent to a mask that has color and covers a whole area of each of the sample documents, wherein the shadow mask comprises a shadow region and a shadow intensity, the sample library comprises a plurality of first sample documents with shadows and a plurality of second sample documents without shadows, and each of the first sample documents is generated by adding the background color and the shadow mask into each of the second sample documents;
    inputting the background color and the shadow mask of each of the sample documents extracted by the shadow prediction model into a predetermined shadow removing network for training to obtain a shadow removing model;
    obtaining a background color and a shadow mask of an object document through the shadow prediction model; and
    inputting the background color and the shadow mask of the object document into the shadow removing model to remove a shadow of the object document.

2. The shadow removing method of claim 1, wherein inputting the background color and the shadow mask of each of the sample documents extracted by the shadow prediction model into the predetermined shadow removing network comprises:
    extracting a background color and a shadow mask of each of the plurality of first sample documents through the shadow prediction model; and
    inputting the background color and the shadow mask of each of the plurality of first sample documents extracted by the shadow prediction model into the predetermined shadow removing network.

3. The shadow removing method of claim 1, wherein training the shadow prediction model based on the sample documents of the sample library comprises:
    training a predetermined deep learning network based on the sample documents of the sample library to obtain the shadow prediction model.

4. The shadow removing method of claim 3, wherein training the predetermined deep learning network based on the sample documents of the sample library to obtain the shadow prediction model comprises:
    dividing the sample documents of the sample library into a training set and a test set;
    training the predetermined deep learning network through the training set to obtain a first intermediate model, and testing the first intermediate model through the test set; and
    defining the first intermediate model as the shadow prediction model if a testing result of the first intermediate model meets a predetermined standard.

5. The shadow removing method of claim 4, further comprising:
    adjusting training parameters of the predetermined deep learning network if the testing result of the first intermediate model does not meet the predetermined standard;
    retraining the predetermined deep learning network with the adjusted training parameters through the training set to obtain a second intermediate model and testing the second intermediate model through the test set;
    defining the second intermediate model as the shadow prediction model if a testing result of the second intermediate model meets the predetermined standard; and
    repeating the adjusting step of the training parameters and the retraining step if the testing result of the second intermediate model does not meet the predetermined standard.

6. A shadow removing device comprising:
    at least one processor; and
    a data storage storing one or more programs which when executed by the at least one processor, cause the at least one processor to:
        train a shadow prediction model based on sample documents of a sample library, wherein training features of each of the sample documents comprises a background color of each of the sample documents and a shadow mask of each of the sample documents, the background color is equivalent to a mask that has color and covers a whole area of each of the sample documents, wherein the shadow mask comprises a shadow region and a shadow intensity, the sample library comprises a plurality of first sample documents with shadows and a plurality of second sample documents without shadows, and each of the first sample documents is generated by adding the background color and the shadow mask into each of the second sample documents;
        input the background color and the shadow mask of each of the sample documents extracted by the shadow prediction model into a predetermined shadow removing network for training to obtain a shadow removing model;
        obtain a background color and a shadow mask of an object document through the shadow prediction model; and input the background color and the shadow mask of the object document into the shadow removing model to remove a shadow of the object document.

7. The shadow removing device of claim 6, wherein the at least one processor to input the background color and the shadow mask of each of the sample documents extracted by the shadow prediction model into the predetermined shadow removing network comprises:
   extract a background color and a shadow mask of each of the plurality of first sample documents through the shadow prediction model; and
   input the background color and the shadow mask of each of the plurality of first sample documents extracted by the shadow prediction model into the predetermined shadow removing network.

8. The shadow removing device of claim 6, wherein the at least one processor to train the shadow prediction model based on the sample documents of the sample library comprises:
   train a predetermined deep learning network based on the sample documents of the sample library to obtain the shadow prediction model.

9. The shadow removing device of claim 8, wherein the at least one processor to train the predetermined deep learning network based on the sample documents of the sample library to obtain the shadow prediction model comprises:

divide the sample documents of the sample library into a training set and a test set;
train the predetermined deep learning network through the training set to obtain a first intermediate model, and test the first intermediate model through the test set; and
define the first intermediate model as the shadow prediction model if a testing result of the first intermediate model meets a predetermined standard.

10. The shadow removing device of claim 9, wherein the at least one processor is further configured to:
   adjust training parameters of the predetermined deep learning network if the testing result of the first intermediate model does not meet the predetermined standard;
   retrain the predetermined deep learning network with the adjusted training parameters through the training set to obtain a second intermediate model and test the second intermediate model through the test set;
   define the second intermediate model as the shadow prediction model if a testing result of the second intermediate model meets the predetermined standard; and
   repeat the adjusting step of the training parameters and the retraining step if the testing result of the second intermediate model does not meet the predetermined standard.

* * * * *